June 12, 1951 G. K. McCANN 2,556,767
INDEPENDENT WHEEL SUSPENSION
Filed Oct. 23, 1946 3 Sheets-Sheet 2

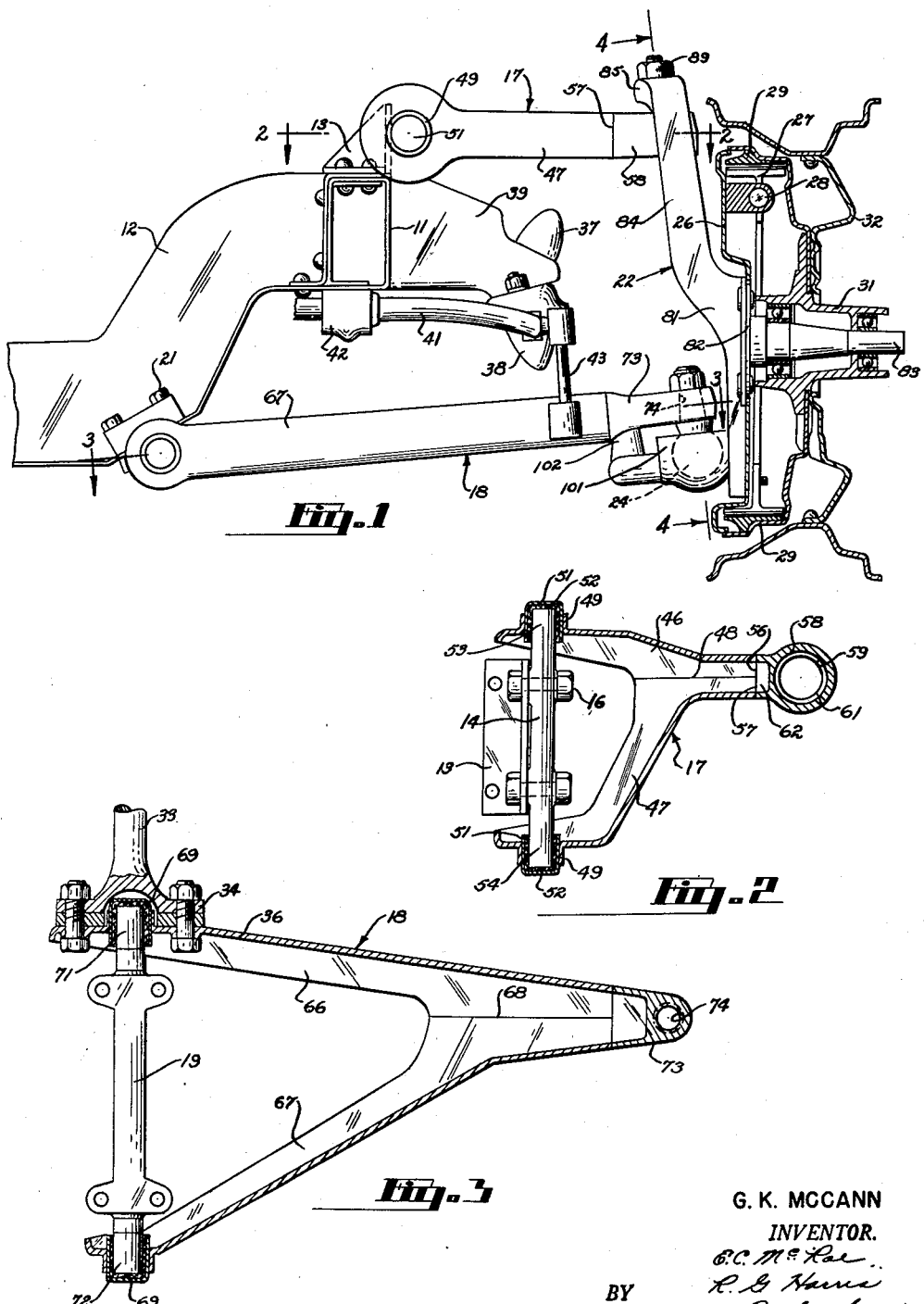

G. K. McCANN
INVENTOR.

BY E. C. McRae,
R. G. Harris,
J. R. Faulkner,
T. H. Oster.
ATTORNEYS

June 12, 1951 G. K. McCANN 2,556,767
INDEPENDENT WHEEL SUSPENSION
Filed Oct. 23, 1946 3 Sheets-Sheet 3

G. K. McCANN
INVENTOR.
BY
ATTORNEYS

Patented June 12, 1951

2,556,767

UNITED STATES PATENT OFFICE 2,556,767

INDEPENDENT WHEEL SUSPENSION

George K. McCann, Detroit, Mich., assignor to Ford Motor Company, Dearborn, Mich., a corporation of Delaware Application October 23, 1946, Serial No. 705,179

1 Claim. (Cl. 267—20)

This invention relates to an independent wheel suspension for a motor vehicle.

An object of the present invention is to provide an independent wheel suspension of the parallel link type in which the outer ends of the upper and lower links are connected by ball joints to the upper and lower portions of the wheel spindle. Vertical displacement of the front wheels, as well as steering movement, are thus provided for with a greatly simplified construction in which a one piece forged spindle replaces the usual wheel supporting member, kingpin, and wheel spindle. The one piece spindle is so constructed as to provide a socket adjacent its lower portion for receiving a ball carried by the outer end of the lower suspension link, while at its upper end the spindle has a gooseneck portion carrying a ball adapted to be seated in a socket formed at the outer end of the upper suspension link. The peculiar construction of the spindle not only provides for mounting the upper ball in an inverted fashion but also provides clearance for the brake fluid lines leading to the front wheel brakes.

Another object of the invention is to provide an independent wheel suspension permitting the use of ball joints of the type having impregnated fabric friction linings interposed between the ball and the socket to provide a smooth operating quiet joint. Ball joints of this type are adapted to carry major loads in one direction only. By forming the wheel spindle and mounting the ball joints as mentioned in the preceding paragraph, the weight of the vehicle as well as all normal springing loads are carried by the ball joint between the lower suspension link and the lower portion of the wheel spindle. The upper ball joint stabilizes the suspension, and being inverted, is adapted to absorb the force to which the upper joint is necessarily subjected when extreme downward movement of the wheel relative to the frame results in engagement of the upper arm with the bumper or stop. This condition may occur during unusual wheel jounce, as when the wheel falls into a chuck hole.

A further object of the invention is to provide a wheel suspension system in which the suspension links are formed of pressed steel members suitably joined to forged pieces at their outer ends. For lightness and economy in manufacture, the major portions of the suspension links are formed in the usual manner of sheet metal stampings, while the extreme outboard ends of the links, which carry the ball joints, are formed of heavier forgings which are butt-welded to the sheet metal portions of the links. The forgings are better adapted to carry either the ball or the socket of the ball joints, as the case may be, and impart increased strength to the suspension system without materially adding to either the weight or the cost thereof.

A still further object of the invention is to provide a wheel supporting member or spindle adapted to directly take the braking forces. This is accomplished by mounting the brake anchor members and the wheel cylinder directly upon the spindle rather than upon the backing plate, or by forming the anchors and wheel cylinder integral with the spindle. With this construction, the backing plate only functions as a shield and need not be constructed heavy enough and strong enough to carry the braking forces, as in the usual construction.

Another object of the invention is to provide means for adjustably connecting the forging at the outer end of the suspension link to the sheet metal portion of the link so that suitable adjustment for camber and caster can be made.

Still other objects will be more apparent as this description proceeds, particularly when considered in connection with the accompanying drawings, in which:

Figure 1 is a fragmentary front elevational view, partly in section, of an independent front wheel suspension embodying the present invention.

Figure 2 is a horizontal cross sectional view through the upper suspension link taken on the plane indicated by the line 2—2 of Figure 1.

Figure 3 is a horizontal cross sectional view through the lower suspension link taken on the plane indicated by the line 3—3 of Figure 1.

Figure 4:
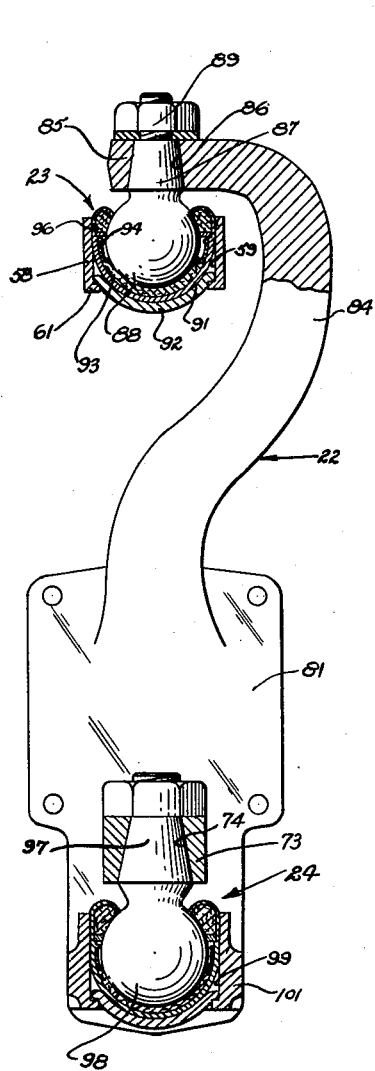
Figure 4 is a vertical cross sectional view taken substantially on the plane indicated by the line 4—4 of Figure 1.

Referring now more particularly to the form of the invention shown in Figures 1 to 6 inclusive, the reference character 11 indicates a longitudinally extending side sill of a vehicle frame, and 12 the front cross frame member extending between the side sills. An angle bracket 13 is mounted upon the side sill 11 adjacent the cross frame member 12 and supports a pivot bar 14, secured thereto by bolts 16. An upper suspension link 17, to be described more in detail later, is pivotally mounted upon the bar 14 for swinging movement in a vertical plane.

The longer lower suspension link 18 is pivotally mounted upon the ends of a pivot bar 19, the latter being secured to the underside of the front cross frame member 12 by means of bolts 21. The outer ends of the upper and lower suspension links 17 and 18 respectively are universally connected to the upper and lower portions of a wheel spindle 22 by ball joints 23 and 24 respectively. The wheel spindle 22 supports the usual brake backing plate 26, the latter supporting brake shoes 27 adapted to be expanded by the hydraulic wheel cylinder 28 into frictional engagement with the brake drum 29. The brake drum 29 is mounted upon the wheel hub 31 which is journaled upon the spindle and which supports the wheel disc 32.

Although other types of springs may be used, there is shown in Figure 3 a torsion bar spring 33 having an upset flange 34 at its forward end bolted to the rear arm 36 of the lower suspension link 18. The rearward end of the torsion bar 33 (not shown) is suitably anchored to a cross frame member.

It will be seen from the foregoing that each front wheel is mounted for independent rising and falling movement with respect to the vehicle frame. Displacement of the wheel relative to the frame is limited in magnitude by the rubber bumpers 37 and 38 mounted upon an extension 39 of the front cross frame member 12 and engageable with the upper and lower suspension links 17 and 18 respectively. A conventional stabilizer bar 41 is provided, being journaled in bushings 42 carried by the frame and connected at its ends to the lower suspension link 18 by connecting links 43.

The foregoing general description of the independent front wheel suspension will now be supplemented by a more detailed description of the upper and lower suspension links 17 and 18 respectively and the wheel spindle 22. Referring to Figure 2, the upper suspension link 17 comprises a pair of channel shaped sheet metal stampings or arms 46 and 47 which are arranged facing each other and which are welded together along their adjacent edges as indicated by the line 48. Adjacent their inboard edges, the arms 46 and 47 of the suspension links are swaged outwardly to form sleeves 49 within which are pressed cup shaped members 51. The cup shaped members 51 contain cup shaped bearing elements 52 of impregnated fabric friction material. The bearing elements 52 frictionally engage the cylindrical end portions 53 and 54 of the pivot bar 14, thus pivotally supporting the suspension link upon the bar.

It will be noted that the outboard ends of the arms 46 and 47 of the suspension links terminate in aligned edges 56 and 57 which are butt welded to the corresponding inboard edge of a short forged member 58. The forged member 58 is of relatively heavy construction and is formed with a vertical bore 59 for receiving the socket portion of the ball joint 23. The bore 59 terminates adjacent its lower end in an annular shoulder 61. To reduce its weight, the forged member 58 is recessed at 62 adjacent its inboard end to form, in effect, a box section inner end.

It will be seen that the suspension link described above is relatively light and inexpensive to manufacture inasmuch as its major portion consists of sheet metal stampings. At the same time, however, the requisite strength and rigidity is imparted to the outer end of the link by forming the latter of a small forging and welding the forging to the sheet metal arms of the link.

It will be noted from an examination of Figure 3, that the construction of the lower suspension link 18 is generally similar to that of the upper suspension link 17. The lower link comprises a pair of channel shaped sheet metal arms 66 and 67 facing each other and welded along their common joint 68. The inboard ends of the arms support friction linings 69 frictionally engaging the cylindrical end portions 71 and 72 of the pivot bar 19. A short forged member 73 is butt-welded to the outer edges of the arms 66 and 67 of the lower link and is formed with a tapered bore 74 to receive the shank of the ball member of the ball joint 24.

Figure 5:
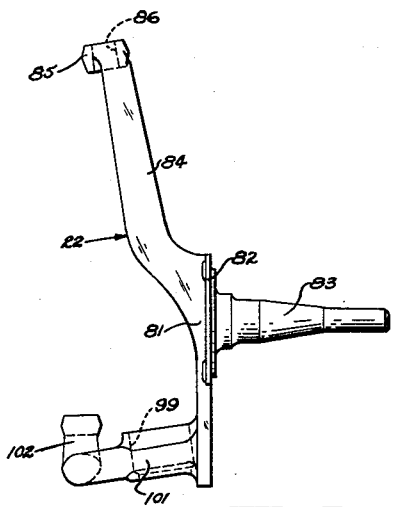
Figure 5 is an elevational view of the front wheel spindle.
Figure 6:
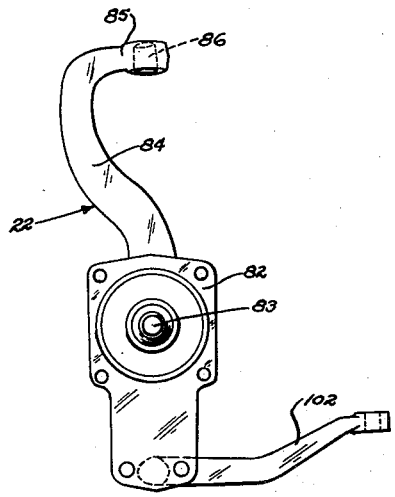
Figure 6 is an end elevation of the wheel spindle shown in Figure 5.

Reference is now made to Figures 4, 5 and 6 which illustrate the detailed construction of the wheel spindle 22. The wheel spindle comprises a single forging and is formed with a generally vertical body portion 81 having a flange 82 to which the brake backing plate is attached and an outwardly projecting spindle portion 83 upon which the wheel hub is rotatably mounted. An arm 84 extends upwardly from the body portion 81 and is formed in the shape of a gooseneck in a vertical longitudinal plane, terminating in a horizontally extending end portion 85 provided with a tapered aperture 86 for receiving the tapered shank 87 of the upper ball member 88. A nut 89 is threaded upon the end of the shank and locks the ball member to the spindle arm. It will be noted that the ball member 88 is inverted, depending downwardly from the upper end portion 85 of the spindle arm 84, and that the gooseneck shape of the upper arm provides clearance for the ball and in addition provides clearance for the other parts of the suspension assembly such as brake fluid lines, etc.

The socket of the upper ball joint 23 comprises a sheet metal shell 91 pressed within the bore 59 of the upper suspension link 17 and seated upon the dished member 92 which is retained in place within the bore 59 by engagement with the annular shoulder 61. The shell 91 contains a spherically shaped bearing member 93 of impregnated fabric lining material which is held in place by a metal retaining ring 94. A packing ring 96 seals the upper end of the joint and the upper edges of the shell 91 are crimped over the packing ring to hold the latter in place.

The lower ball joint 24 is identical in construction with the upper joint 23 described above, but it will be noted that the shank 97 of the ball member 98 is mounted within the tapered bore 74 provided in the forged member 73 at the outer end of the lower suspension link rather than in the spindle, and that the socket portion of the joint is mounted within the vertical bore 99 formed in the flange 101 extending in an inboard direction from the lower end of the body portion 81 of the spindle. An integral steering arm 102 projects inwardly and rearwardly from the flange 101.

Ball joints of the type described above are adapted to carry load in one direction only, but are extremely satisfactory since they require no lubrication, are long-lived and quiet in operation. The weight of the vehicle is transmitted through the lower suspension link 18 and the lower ball joint 24 to the wheel spindle in a downward direction, and suspension loads caused by road irregularities are transmitted through the ball joint 24 to the lower suspension link 18 in an upward direction. The ball joint 24 is disposed in such a manner as to carry such loads. The upper ball joint 23, on the other hand, stabilizes the suspension, and, in addition, being inverted with the socket carried in the upper suspension link, is adapted to properly transmit forces imposed upon it by extreme downward displacement of the wheel relative to the frame resulting in engagement of the upper link with the rubber bumper 37 on the frame.

From the foregoing description it will be apparent that the independent front wheel suspension shown in the drawings is adapted to accommodate steering movements of the wheel as well as rising and falling movements thereof, is noiseless in operation, of rigid sturdy construction, and substantially reduces the number of parts heretofore necessary.

Figure 7:
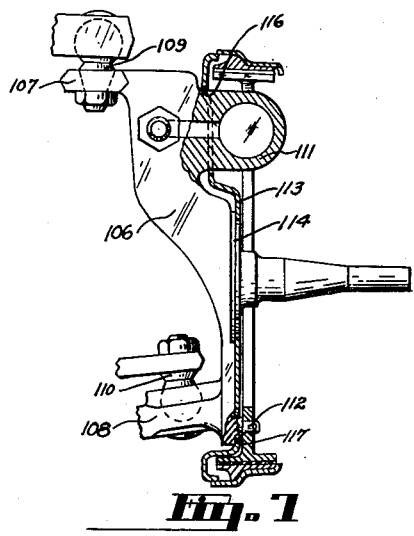
Figure 7 is a fragmentary elevational view, partly in section, of a modified wheel suspension construction.

Referring now to the modification shown in Figure 7, it will be noted that a forged wheel spindle 106 is provided and that the wheel spindle has upper and lower flanges 107 and 108 supporting parts of ball joints 109 and 110. It will be noted that the upper ball joint 109 is mounted in an upright direction, which is permissible using other types of ball joints than that shown in Figures 1 to 4 inclusive. The principal features of this modification reside in integrally forming a wheel cylinder 111 with the forged stamping 106, and also forming brake anchor members 112 integrally with the spindle. With this construction, the brake backing plate 113 is mounted upon the flange 114 of the spindle, and is provided with enlarged apertures 116 and 117 through which the wheel cylinder 111 and brake anchors 112 project. It will be apparent that with this arrangement the brake backing plate functions only as a shield and does not carry any major structural part of the brake mechanism. Since the entire braking forces are thus taken by the wheel spindle, the backing plate can consequently be of lighter and cheaper construction.

Figure 8:
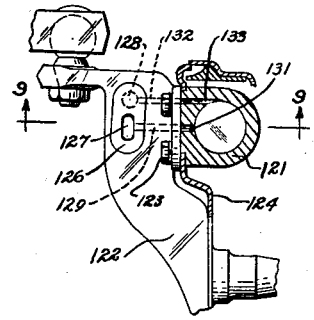
Figure 8 is a fragmentary view similar to Figure 7 but illustrating another modification.
Figure 9:
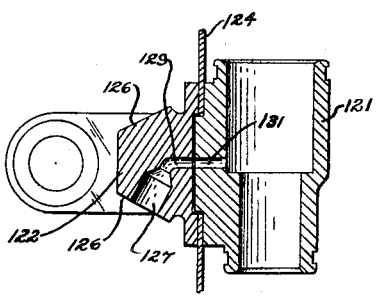
Figure 9 is a horizontal cross sectional view taken substantially on the plane indicated by the line 9—9 of Figure 8.

In the modification shown in Figures 8 and 9, the wheel cylinder 121 is formed separately from the wheel spindle 122, but is secured thereto by bolts 123 so that the reaction forces are taken by the spindle. In this instance the brake backing plate 124 is clamped between the wheel spindle and the wheel cylinder. Bosses 126 are formed on opposite faces of the wheel spindle 122 and are provided with ports 127 and 128 respectively into which suitable hydraulic fittings may be inserted. The port 127 communicates with the interior of the wheel cylinder 121 through passages 129 and 131 formed respectively in the wheel spindle 122 and the wheel cylinder 121. Fluid under pressure from the master cylinder (not shown) is supplied through these passages to the wheel cylinder to actuate the brake. The other port 128 communicates with the upper portion of the wheel cylinder through passages 132 and 133 formed respectively in the wheel spindle and in the wheel cylinder to provide for bleeding the system. Among the advantages of this construction are the fact that the wheel cylinder is removable and can be replaced if necessary and that the hydraulic connections to the wheel cylinder can readily be made through the wheel spindle.

Figure 10:
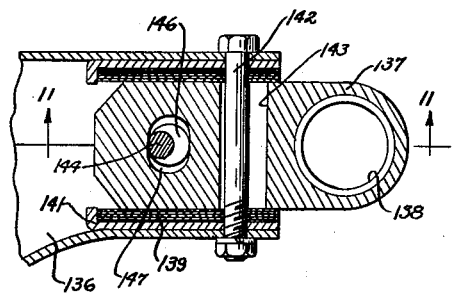
Figure 10 is a fragmentary horizontal cross sectional view through the outer end of a wheel suspension link showing another modification.
Figure 11:
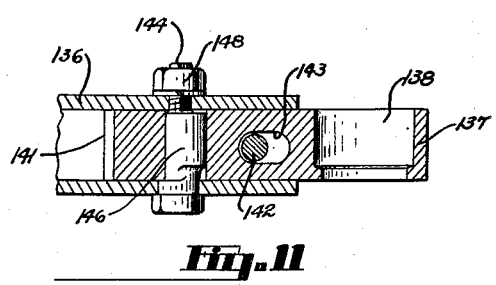
Figure 11 is a vertical cross sectional view taken substantially on the plane indicated by the line 11—11 of Figure 10.

Figures 10 and 11 illustrate a modification in which means are provided for adjusting the camber and caster of the front wheels. The reference character 136 indicates the outer end of a sheet metal suspension link having a box shaped cross section such as would be formed by welding together two channel shaped arms having their channels facing each other. The box section link forms a guideway for a forged member 137, the latter being provided with a vertical bore 138 at its outer end for receiving the socket of a ball joint (not shown). A plurality of shims 139 are mounted adjacent opposite walls of the link 136, being held in place by shim retainers 141 and a bolt 142 extending through the shims, shim retainers, and walls of the suspension link.

The forged member 137 is provided with a transversely extending elongated hole 143 through which the bolt 142 passes, thus providing sufficient clearance around the bolt for reciprocation of the member 137. As best seen in Figure 11, an adjusting bolt 144 is rotatably mounted in the sidewalls of the suspension link 136, and is formed intermediate its ends with an eccentric portion 146 passing through an elongated hole 147 in the forged member 137. It will be apparent that rotation of the adjusting bolt 144 reciprocates the forged member 137 relative to the suspension link 136, and that this adjustment is effective to vary the camber of the front wheel. After suitable adjustment, the nut 148 on the adjusting bolt 144 can be tightened to clamp the parts in adjusted position.

Caster adjustment is effected by varying the number of shims 139 on opposite sides of the forged member 137. It will be seen that increasing the number of shims on one side while correspondingly decreasing the number on the opposite side results in moving the forged member 137 longitudinally of the vehicle, and thus adjusts the caster of the front wheel.

The construction shown in Figures 10 and 11 need only be used in connection with only the upper or the lower suspension arm to effect the desired camber and caster adjustment, and the other arm may be formed as shown in Figures 2 or 3 of a welded construction.

It will be understood that the invention is not to be limited to the exact construction shown and described, but that various changes and modifications may be made without departing from the spirit and scope of the invention, as defined in the appended claim.

What is claimed is:

In an independent wheel suspension for a motor vehicle, a suspension link comprising a pair of sheet metal channel arms disposed with their respective upper and lower flanges facing toward each other, said arms diverging at one end to form bifurcations and at their other ends being arranged with their respective flanges in edge to edge engagement and welded together to form a box section at the outer end of said suspension link, said sheet metal arms having aligned embossed openings adjacent one end and being square cut at their outer ends, and a short forging forming an extension of said sheet metal arms, said forging having a socket formed in its inner end to form a box section corresponding in cross-sectional shape and dimensions to the box section at the outer end of said suspension link and butt-welded to the square cut ends of said arms.

GEORGE K. McCANN.

REFERENCES CITED

The following references are of record in the file of this patent:

UNITED STATES PATENTS

| Number | Name | Date |
|---|---|---|
| 2,123,087 | Leighton | July 5, 1938 |
| 2,123,089 | Leighton | July 5, 1938 |
| 2,130,288 | Olley | Sept. 13, 1938 |
| 2,173,973 | Leighton | Sept. 26, 1939 |
| 2,226,406 | Krotz | Dec. 24, 1940 |
| 2,228,107 | Best | Jan. 7, 1941 |
| 2,253,436 | Leighton | Aug. 19, 1941 |
| 2,281,555 | Castiglia | May 5, 1942 |
| 2,290,923 | Wahlberg | July 28, 1942 |
| 2,297,901 | Leighton | Oct. 6, 1942 |
| 2,299,935 | Slack et al. | Oct. 27, 1942 |
| 2,321,832 | Leighton | June 15, 1943 |
| 2,414,674 | Slack et al. | Jan. 21, 1947 |

FOREIGN PATENTS

| Number | Country | Date |
|---|---|---|
| 419,562 | Great Britain | Nov. 14, 1934 |
| 443,248 | Great Britain | Feb. 25, 1936 |